US007284165B2

(12) United States Patent
Auvenshine et al.

(10) Patent No.: US 7,284,165 B2
(45) Date of Patent: Oct. 16, 2007

(54) COMPUTER GENERATED DOCUMENTATION INCLUDING DIAGRAM OF COMPUTER SYSTEM

(75) Inventors: Jason Auvenshine, Tucson, AZ (US); Justin Christopher Blackburn, Goodyear, AZ (US); Christopher Joel Jacoby, Chandler, AZ (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 10/868,512

(22) Filed: Jun. 15, 2004

(65) Prior Publication Data
US 2005/0278571 A1 Dec. 15, 2005

(51) Int. Cl.
*G06F 11/00* (2006.01)

(52) U.S. Cl. .......................... 714/57; 715/736
(58) Field of Classification Search ............. 714/57, 714/46, 26, 27; 715/734, 736; 370/248
See application file for complete search history.

(56) References Cited

U.S. PATENT DOCUMENTS

| | | | | |
|---|---|---|---|---|
| 5,910,803 | A * | 6/1999 | Grau et al. ................. | 715/734 |
| 6,031,528 | A * | 2/2000 | Langfahl, Jr. .............. | 715/734 |
| 6,225,999 | B1 * | 5/2001 | Jain et al. .................. | 715/734 |
| 6,353,446 | B1 | 3/2002 | Vaughn et al. ............. | 345/733 |
| 6,425,007 | B1 * | 7/2002 | Messinger .................. | 709/224 |
| 6,539,499 | B1 | 3/2003 | Stedman et al. ............ | 714/40 |
| 6,941,359 | B1 * | 9/2005 | Beaudoin et al. .......... | 709/221 |
| 6,981,228 | B1 * | 12/2005 | Chen et al. ................ | 715/853 |
| 7,003,567 | B2 * | 2/2006 | Suzuki et al. .............. | 709/224 |
| 7,159,151 | B2 * | 1/2007 | Morgan et al. ............. | 714/43 |
| 2002/0133575 | A1 | 9/2002 | Cidon et al. ............... | 709/220 |
| 2002/0144187 | A1 | 10/2002 | Morgan et al. ............. | 714/43 |
| 2003/0046390 | A1 | 3/2003 | Ball et al. .................. | 709/224 |
| 2003/0051195 | A1 | 3/2003 | Bosa et al. ................. | 714/43 |
| 2003/0145075 | A1 | 7/2003 | Weaver et al. ............. | 709/223 |

(Continued)

OTHER PUBLICATIONS

IBM Technical Disclosure Bulletin vol. 30 No. 8 Jan. 1988 "Data Processing Center Autohelp Tool".

*Primary Examiner*—Marc Duncan
(74) *Attorney, Agent, or Firm*—Arthur J. Samodovitz

(57) ABSTRACT

A system, method and program for troubleshooting a problem with an application. An application server which is supposed to be executing the application and a database or a server which manages the database are identified. The application, when executing, obtains data from the database to respond to a client request. The application server, database or database server, and a connection between the application server and the database or database server are generated and displayed or printed. Also, one or more hyperlinks to automatically send a hardware, software, or network status inquiry to the application server to test operability of the application server and/or a connection to the application server and automatically send a hardware, software, or network status inquiry to the database server to test operability of the database server and/or a connection to the database server are generated and displayed or printed. In accordance with a feature of the present invention, in response to a selection of the one or more hyperlinks, the application server and database server are automatically pinged. The invention also resides in a system and program for automatically identifying the database or database server by querying the application server, and generating and displaying or printing the diagram of the application server, database or database server, and a connection between the application server and the database or database server.

6 Claims, 6 Drawing Sheets

U.S. PATENT DOCUMENTS

2003/0149919 A1     8/2003   Greenwald et al. ........... 714/43
2003/0225876 A1*   12/2003   Oliver et al. ............... 709/224
2004/0153865 A1*   8/2004   Schoenfeld et al. .......... 714/46
2005/0182779 A1*   8/2005   Perry et al. ................. 707/101

* cited by examiner

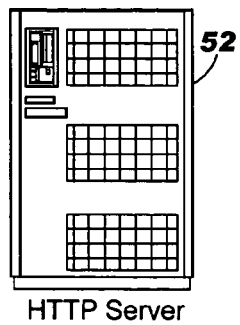
HTTP Server

FIG. 6

Applications on this server

Application A
Application B
Application C

Testing Instructions

Connectivity Test
    (automated hyperlink)

Connectivity Test
    (manual instructions)

1. Open command window in helpdesk workstation
    click on start, run and type cmd in window
2. Type the following
    "ping httpserver1.(domain name).com If this does not produce a response 3. Type the following
    "ping 10.1.15.222"

If this produces a response but step 2 did not,
ensure that DNS is working correctly. If no response 4. Logon Test
    - Open the start menu on helpdesk workstation
    - Run-Type "cmd"
    - In the command window type the following
        "telnet serverip-address"
        (automatically determines the correct IP)
    - Input userid and password 5. Attempt to access the following URL's by opening
    a web browser http://httpserver1.(domain name).com
    http://10.1.15.222
If still no response, this likely indicates a networking
issue or that the server is disconnected or down.

COMPUTER GENERATED DOCUMENTATION INCLUDING DIAGRAM OF COMPUTER SYSTEM

BACKGROUND OF THE INVENTION

The invention relates generally to computer systems, and deals more particularly with a computer controlled guide to assist a help desk person solve a customer's problem with a computer application.

A "help desk" is well known today, and typically comprises a skilled person with a telephone to receive calls from customers regarding computer related problems, and a (computer) workstation to assist in resolving the problems. The workstation typically includes a web browser or other portal program to access the applications for which the customers often have problems. Both the help desk workstation and the customer may access the applications from remote servers. The help desk workstation is also typically equipped with a program tool to access a problem ticketing system. The help desk personnel may be structured hierarchically, with the lowest skilled ("first level") support people sitting at the help desk workstation to interface directly with the customers, and higher skilled ("second level") support people available elsewhere to interface to the first level support people and answer difficult questions that the first level support people cannot. Typically, customers are allowed to call (telephone) a help desk when they are having a problem with an application running on their own computer or on the remote server. The first level support person at the help desk then attempts to troubleshoot the problem based on personal experience/knowledge and application support documentation, with or without assistance from the second level support people. Sometimes, even the second level support people cannot solve the problem. In such a case, the first or second level support person can call a technical expert for the application or system in question. This technical expert is typically a computer scientist or programmer responsible for developing and/or maintaining the application or system.

Large scale server operations, such as a large web hosting system or large data processing system, typically require extensive help desk and technical support. Ideally, the first level support person can quickly solve the customer's problem without involving either the second level support person or the technical expert. In such a case, the help desk will incur the cost of only one person. Also, the first level support person is generally lower paid than the second level support person. While the involvement of the second level support person adds to the cost, this is still preferable to involving the technical expert. Generally, the technical expert is much higher paid than even the second level support person and has other duties. So, it is preferable to minimize the role of the technical expert in help desk support. Also, solving problems without involving second level support people or technical experts expedites resolution of the problem.

The application support documentation is key to effective help desk support. The (known) application support documentation typically comprises names of servers that run the application, data flows and protocols, technical contacts, URLs, file system directories used by the application, and test login procedure. During server and application development and deployment, the development and deployment personnel often neglect to document critical aspects of the architecture and implementation for the application support documentation. Also, developers and steady state support personnel often modify the application and servers over time to include new backend databases, new connectivity and new uses, and fail to update the application support documentation. This causes additional deficiencies and inaccuracies in the application support documentation. Consequently, many applications and servers lack documentation to guide the help desk people to perform test procedures required to troubleshoot and correct the customers' problems. Such deficiencies and inaccuracies in application support documentation may prolong outages and cause excessive numbers of calls from the first level support person to the second level support people and technical experts. Also, the lack of application support documentation compounds the effort and cost required to solve a customer's problem.

Configuration information needed by the help desk personnel is often stored within a server. However, the help desk personnel may be prevented from accessing or understanding configuration information in a server. For example, access to configuration files within the server may be limited to people with "super user", "root" or "administrator" privilege level. This is because the configuration affects overall operation of the applications, and may include user IDs and passwords. The help desk people typically lack such a high privilege level. Even when a help desk person has permission to (remotely) access configuration information within a server, the help desk person may not understand the format of the information because it may be designed for an application to read. Also, the helpdesk person may cause additional damage if the help desk person is not properly trained or follows an improper procedure.

Oftentimes, an application (such as a web site application) will be "down" because a single backend database used by the application does not respond. The backend database itself may be down or the communication link between the application and the backend database may be down. Because help desk people (first and second level) may not be familiar with the server architecture, including the backend databases, they may erroneously think the application or the server on which the application is running is malfunctioning whereas the problem is actually with the backend database or its connection to the application. In such a case, the help desk people will not be able to correct the problem, and may even call a developer of the application or the server on which it is running for technical support. Typically, the developer of the application or server on which it is running will not know the identity or state of the backend databases, and cannot solve the problem. In such a case, the time and effort of first and second level support people and one or more technical experts will be wasted. Without identifying the backend database as the problem, the support people may not even know the proper systems administrator to call to trouble shoot the problem.

The hardware, software or network components used in supporting an application may themselves incorporate the capability of providing status and diagnostic information in response to an inquiry or test. The simplest such inquiry is the common TCP/IP network "ping", "traceroute" or "netstat" inquiry, however existing hardware, software, and network components also provide more detailed status and diagnostic information than is available via "ping", "traceroute" and "netstat". For example, a DCE/DFS file system includes the ability to query the ability of file servers to serve files, all the way through the software stack. The ability to initiate such tests or queries for status data is a significant aid in determining the source of a problem. Inquiries for this data are typically initiated by a skilled operator entering a command or set of commands on the server being queried or a remote server connected via a network. Multiple steps, including login/authentication, setting environment or software debug parameters, command initiation, and output parsing, may be required in order to obtain the results of a status inquiry. The operator then interprets the results and determines whether the queried component is functioning within normal parameters. A help desk operator may be unaware of the availability of this diagnostic data, unable to properly initiate the queries required to access it, or unable to properly interpret the results of such a query. In such a case, the help desk operator may not be able to determine if, or where, a problem exists and will need to call in technical experts to properly initiate status queries and interpret the results of such queries.

U.S. Patent Publication U.S. 2003/0149919 A1 discloses systems and methods for diagnosing faults in computer networks. A topology mapper provides a network topology including the location of key services (such as e-mail, DNS, web server). The system uses the network topology to dynamically generate a thorough traceroute using a path-tracing algorithm. A fault diagnosis engine diagnoses a fault related to the communications network. The network management system also includes a help desk.

U.S. Pat. No. 6,353,446 discloses a program to assist a service person in managing an enterprise network. Network visibility software provides access to information from both local and remote client/server networks, providing a central control point from which to manage traffic on distributed networks. Network visibility software assists in explaining possible causes for network problems, collects expert analysis data automatically based on user-specified time intervals and data parameters, learns network configurations continuously, shows breakdown of network protocol activity automatically, and displays network errors. Nevertheless, further improvements are desired to assist help desk people troubleshoot and correct problems with applications and servers.

Other systems for mapping network topology were known that proactively map how networks are connected and where IP addresses reside within networks. These systems test for network connectivity of servers and other computer devices, and generate lists of what server or other computer device is connected to what network at the TCP/IP layer of the network stack. For example, the mapping will indicate on which subnet each server or other computer device resides. Other systems gather network statistics from a network interface to determine if there are any TCP/IP connections.

An object of the present invention is to automatically guide a help desk person in troubleshooting and correcting a customer problem in utilizing an application.

Another object of the present invention is to automatically guide a help desk person in troubleshooting and correcting such a customer problem, where the problem resides in an application used by the customer, a server which executes the application, a related application on another server, a backend database which supports either application or a communication link between the server and a backend database.

SUMMARY OF THE INVENTION

The invention resides in a system, method and program for troubleshooting a problem with an application. An application server which is supposed to be executing the application and a database or a server which manages the database are identified. The application, when executing, obtains data from the database to respond to a client request. The application server, database or database server, and a connection between the application server and the database or database server are generated and displayed or printed. Also, one or more hyperlinks to automatically send a hardware, software, or network status inquiry to the application server to test operability of the application server and/or a connection to the application server and automatically send a hardware, software, or network status inquiry to the database server to test operability of the database server and/or a connection to the database server are generated and displayed on the computer screen. In accordance with a feature of the present invention, in response to a selection of the one or more hyperlinks, the application server and database server are automatically queried for hardware, software, and/or network status. One type of hardware, software or network status inquiry is a "ping".

The invention also resides in a system and program for creating a reference document for an application. An application server which is supposed to be executing the application is identified. Then, a database server from which the application obtains data to respond to a client request is identified by querying the application server. Then, a diagram of the application server, the database server or a database managed by the database server, and a connection between the application server and the database server or managed database are automatically generated and displayed or printed. In accordance with features of the present invention, the application server is identified based on user input of an identification of said application. The diagram also includes a description of a procedure for logging onto the application server. The diagram also illustrates another application server that participates with the first application server in responding to a customer request, and a connection between the other application server and the first application server. The diagram also illustrates another database or another server that manages the other database for the other application.

BRIEF DESCRIPTION OF THE FIGURES

FIG. 6 is an example of manual instructions generated by the documentation management server and related programming of FIG. 2 to test connectivity to a server selected from the diagram of FIG. 5.

DETAILED DESCRIPTION OF THE PREFERRED EMBODIMENTS

Figure 1:
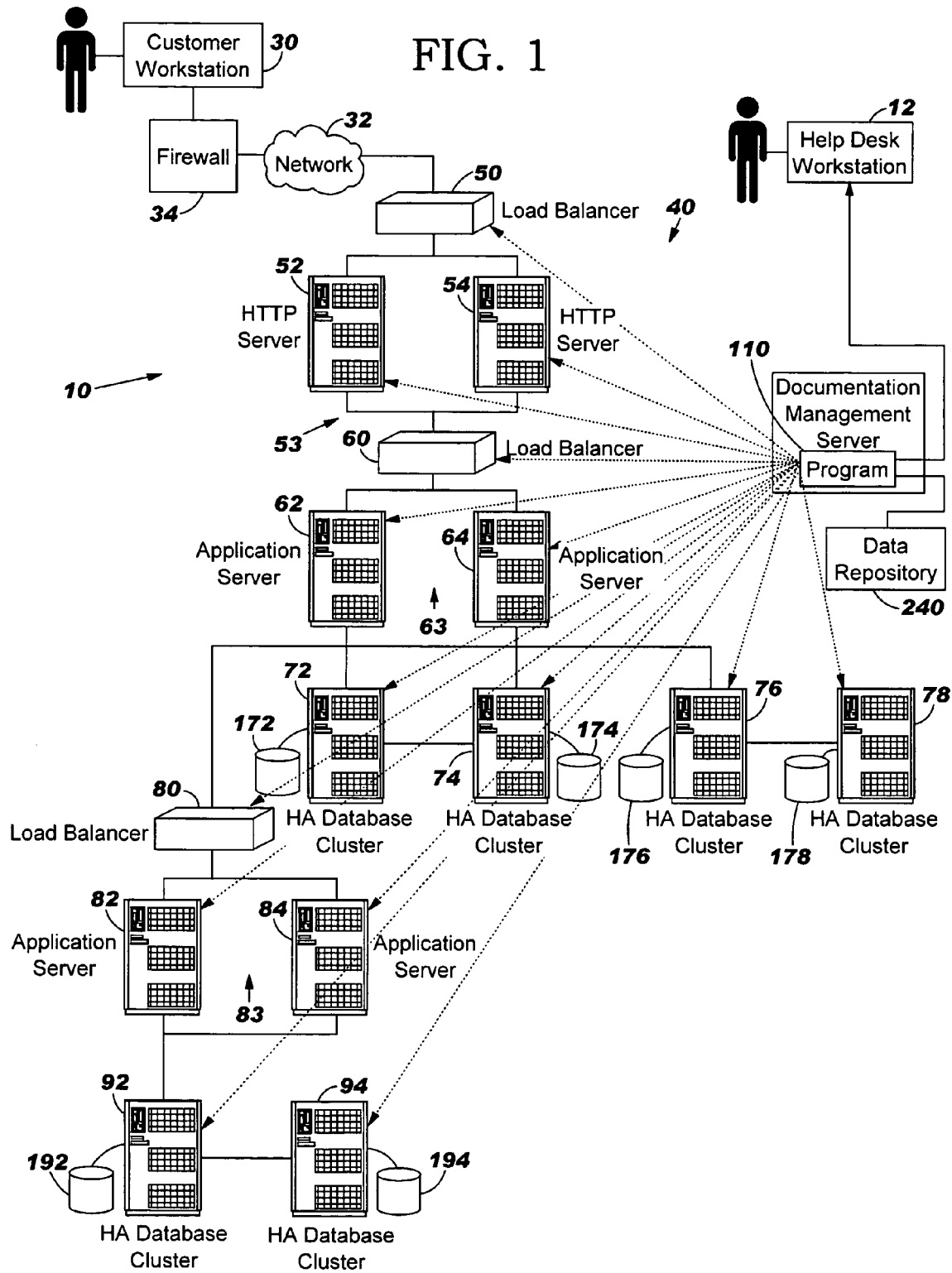
FIG. 1 is a block diagram of a distributed computer system, a help desk workstation and a documentation management server according to the present invention.

The present invention will now be described in detail with reference to the figures. FIG. 1 illustrates a distributed computer system generally designated 10, a help desk workstation 12 and a documentation management server 20 according to the present invention. Distributed computer system 10 comprises a customer workstation 30 coupled by a network 32 and an optional firewall 34 to a distributed server system 40. The network 32 can be an intranet, the Internet or an extranet, and can use a variety of network protocols such as TCP/IP or SNA. The distributed server system 40 can take various forms and have various architectures with varying numbers, arrangements and layers of servers, such as the that illustrated in FIG. 1. In FIG. 1, requests from client workstation 30 for an application are forwarded via the network 32 to a load balancer 50 for a cluster 53 of servers. Load balancer 50 then selects server 52 or 54 within the cluster 53 to handle the request, based on their availability or other known load balancing criteria. By way of example, servers 52 and 54 are web servers, i.e. handle requests via the Internet for applications represented by web pages However, in another embodiment of the distributed server system 40, the client requests are forwarded directly to a single web (or other type of) server such as server 52 (and there is no load balancer 50 or server 54). In the embodiment illustrated in FIG. 1, the application requested by the client workstation 30 does not reside on server 52 (or 54). So server 52 determines, based on an internal configuration file, the IP address of another server or server cluster that contains the requested application. Server 52 also includes a program used to communicate with this other server or cluster. In the embodiment illustrated in FIG. 1, server 52 forwards the customer request to a load balancer 60 for a cluster 63 of application servers. Load balancer 60 then selects one application server 62 or 64 in cluster 63, such as server 62, to handle the request, based on their availability or other known load balancing criteria. However, in another embodiment of the distributed server system 40, the client requests are forwarded directly from server 52 to a single application server such as server 62 (and there is no load balancer 60 or server 64).

In the embodiment illustrated in FIG. 1, each of the application servers 62 and 64 comprises a middleware program in addition to the actual application requested by the client workstation 30. The middleware program is responsible for managing differences in format and protocol, if any, between the client request and the requested application. The application on server 62 is responsible for obtaining the data pertaining to the customer request and performing any computations pertaining to the customer request. In the illustrated embodiment, the application on server 62 can obtain the data from backend database servers 72, 74 or 76. Each backend database server 72, 74 and 76 obtains the requested data from one or more data repositories, such as respective disk storages 172, 174 and 176. In high availability environments, there will ordinarily be a backup (backend) database server in case the primary (backend) database server fails. In the illustrated embodiment, backend database servers 72 and 74 can perform this backup role for each other, and a backend database server 78 backs-up database server 76. In some cases, the application on server 62 generates a web page or other screen to send to the client workstation based on the data which it obtains. The web page or other screen permits the customer to interactively use the application. In other cases, the middleware program on server 62 or 64 generates the web page or other screen for display on client workstation 30, based on data supplied by the application. In both cases, the application generally needs to obtain data from one of the database servers 72, 74 or 76. In the case of a web server, the data may be a web page itself.

In many cases such as illustrated in FIG. 1, a single application executing on server 62 (or 64) is able to handle the customer request by directly querying backend database servers 72, 74 or 76, for the requisite data (and then processing the data if needed). However, in other cases also illustrated in FIG. 1, the single application on server 62 cannot alone handle the customer request, even with data from backend database server 72, 74 or 76. For example, if the customer request requires two different services such as one to list homes for sale and another to process a mortgage request, two different applications may be required, one to display the list of the homes for sale and manage the interface to the customer, and the other application to process the mortgage request. In such a case, the application in server 62 may supply one of the services (and obtain the data for that service from backend database server 72, 74 or 76), but may need to query another server or server cluster for the other application to process the mortgage request (and obtain the data for that service from another backend database. In the illustrated embodiment, this other cluster 83 of servers comprises a load balancer 80 and application servers 82 and 84. Each of the application servers 82 and 84 comprises the second (for example, mortgage) application as noted above which accesses database server 92 or 94 for the requisite data. Each of the application servers 82 and 84 also comprises middleware if necessary to interface to the format and protocol of the client request and format a web page or other screen for display at the client workstation. Each backend database server 92 and 94 accesses one or more data repositories, such as respective disk storages 192 and 194. In high availability environments, there will ordinarily be a backup (backend) database server in case the primary (backend) database server fails. In the illustrated embodiment, backend database servers 92 and 94 can perform this backup role for each other. The foregoing features of server system 40 were known in the industry.

"Agent" programs 552, 554, 562, 564, 572, 574, 576, 578, 582, 584, 584, 592 and 594 run on the web servers, application/middleware servers and database servers 52, 54, 62, 64, 72, 74, 76, 78, 82, 84, 92 and 94, respectively within server system 40 to automatically gather configuration and other information about the respective servers and supply the information to server 20. If the load balancers 50, 60 and 80 are capable or running agent programs (for example, have operating systems capable or running agent programs), then respective agent programs run on the load balancers 50, 60 and 80 as well. In the illustrated embodiment, agent programs 550, 560 and 580 run on load balancers 50, 60 and 80. However, in an alternate embodiment, one or more of the load balancers 50, 60 or 80 do not include agent programs. (Agent programs that can gather data in a server were known in the art, but have been customized according to the present invention to gather configuration and other information needed to implement the present invention.) A documentation generation program 110 runs on server 20, receives the configuration and other information supplied by agent programs 550, 552, 554, 560, 562, 564, 572, 574, 576, 578, 580, 582, 584, 592 and 594, and automatically generates application support documentation to assist the help desk people troubleshoot and correct customer problems with server system 40. The documentation generation program 110 and agent programs 550, 552, 554, 560, 562, 564, 572, 574, 576, 578, 580, 582, 584, 592 and 594 are further described below with reference to FIGS. 2-4.

Figure 2:
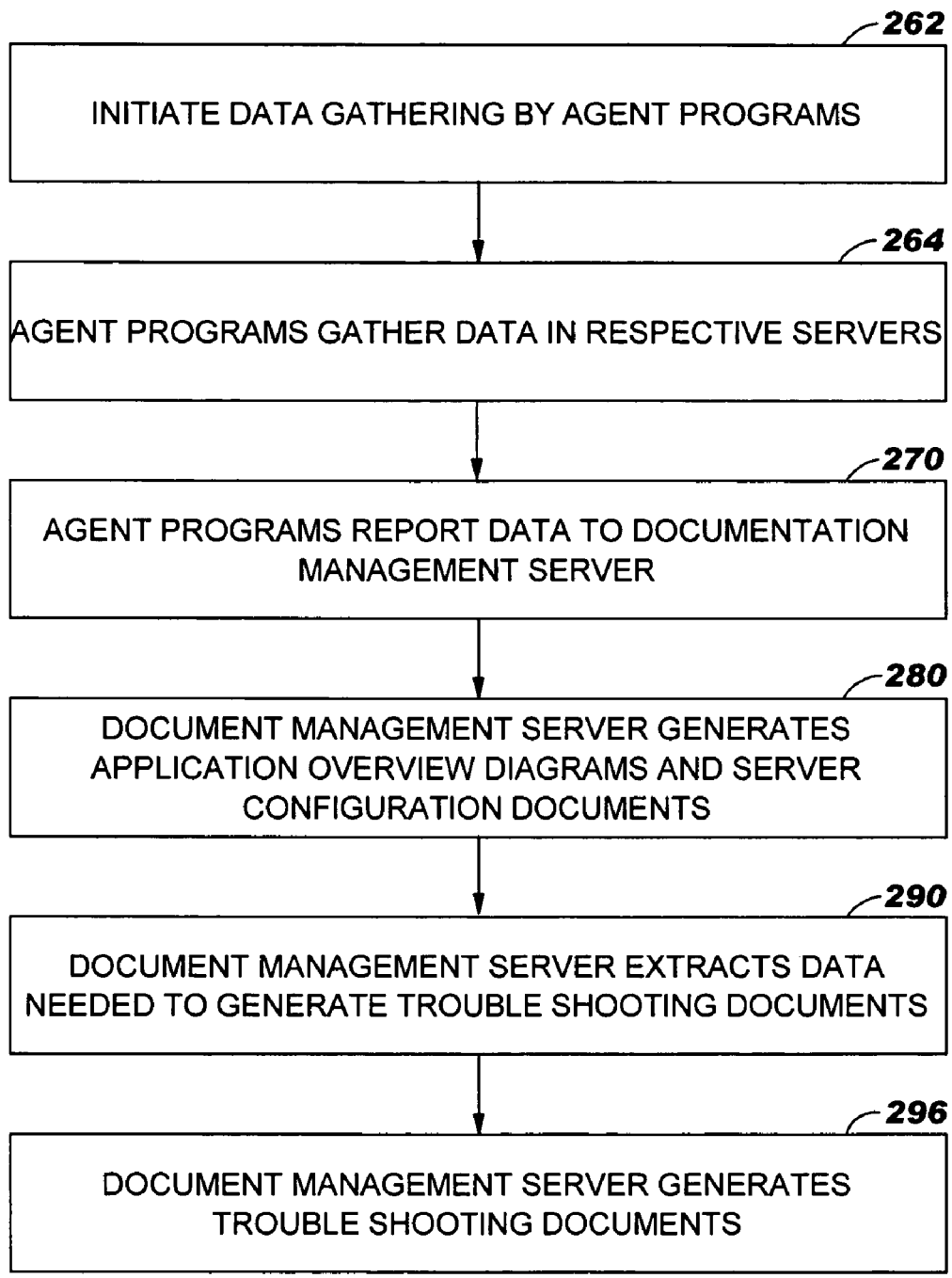
FIG. 2 is a flow of programming within the documentation management server and related programming within the servers of the distributed computer system of FIG. 1 to generate application support documentation according to the present invention.

FIG. 2 illustrates the overall operation of documentation generation program 110 and agent programs 550, 552, 554, 560, 562, 564, 572, 574, 576, 578, 580, 582, 584, 592, and 594. In step 262, the data gathering by the agent programs 550, 552, 554, 560, 562, 564, 572, 574, 576, 578, 580, 582, 584, 592 and 594 within server system 40 is initiated. In some cases, program 110 periodically sends requests to agent programs 550, 552, 554, 560, 562, 564, 572, 574, 576, 578, 580, 582, 584, 592 and 594 to gather the configuration and other data from their respective servers. In other cases, the agent programs 550, 552, 554, 560, 562, 564, 572, 574, 576, 578, 580, 582, 584, 592 and 594 initiate their own data gathering activity, either based on their own predetermined schedule or based on occurrence of events or significant changes, such as changes to configuration in their respective servers. In step 264, agent programs 550, 552, 554, 560, 562, 564, 572, 574, 576, 578, 580, 582, 584, 592 and 594 begin the actual data gathering in their respective servers. By way of example, agent programs 550, 552, 554, 560, 562, 564, 572, 574, 576, 578, 580, 582, 584, 592 and 594 comprise script programs which execute on their respective servers to solicit or read configuration and other information from the operating systems and configuration files within their respective servers. Then, agent programs 550, 552, 554, 560, 562, 564, 572, 574, 576, 578, 580, 582, 584, 592 and 594 report the information to program 110 in documentation management server 20. For example, agent programs 550, 552, 554, 560, 562, 564, 572, 574, 576, 578, 580, 582, 584, 592 and 594 may gather configuration information from Apache httpd.conf configuration file and IBM Websphere adminlconfig configuration file.

For each of the web servers 52 and 54, these configuration files contain the following types of information: (a) a list of the URLs that lead to/reside on the web server, and for each of these URLs (i) when the requested application resides on another, application/middleware server, an identification of this other application/middleware server (by IP address and virtual host), or (ii) when the requested application resides on the web server, a reference to static data files that contain requested information for the application, or (iii) when the requested function can be performed by a scripting file (for example, "CGI" script files) on the web server, and a pointer to the scripting file.

For each of the application/middleware servers 62, 64, 82 and 84, these configuration files contain the following types of information: (a) a list of the URLs that lead to/reside on this web server, and for each of these URLs (i) when the requested application resides on another, application/middleware server, an identification of the application/middleware server (by IP address and virtual host), or (ii) when the requested application resides on the web server, a reference to static data files that contain requested information for the application, or (iii) when the requested function can be performed by a scripting file (for example, "CGI" or java script files) on the web server, a pointer to the scripting file and (b) for each virtual host in the application/middleware server, (i) an identity (by IP address and database instance or port) of the connection to the backend database server(s) accessed by the virtual host, (ii) identities of other application servers that run the same application, (iii) identities of other application servers that access the same database, if known.

For each of the database servers 72, 74, 76, 78, 92 and 94, these configuration files contain the following types of information: (a) list of ports used to connect the database server to the application servers which access the database server, (b) list of ports on the database server which are used to connect the database server to each database or "database instance" (on disk) accessed by the database server, (c) password used by each application to access each database instance via the database server.

For each of the load balancing servers 50, 60 and 80, these configuration files contain the following types of information: (a) list of IP addresses for servers in the cluster that the load balancer balances, (b) list of ports used by the load balancing server for each of the servers in the cluster.

The agent programs gather the foregoing information from the configuration files in their respective servers, and report this information to server 20. The data gathering by the agent programs in step 264 is described below in more detail with reference to FIG. 3.

After receiving the data from agent programs 550, 552, 554, 560, 562, 564, 572, 574, 576, 578, 580, 582, 584, 592 and 594, documentation generation program 110 enters the data into a document management file/database 240 (step 270). Then for each application in a server in server system 40, program 110 generates a respective application overview diagram. For each server in server system 40, program 110 generates a respective server configuration document (step 280).

Each of the application overview diagrams and server configuration documents is based on the information gathered in step 264, but is organized on a per application basis and a per server basis. Each application overview diagram is a graphical representation of the architectural information gathered in step 264, and also includes related application information such as URL, Database Name, and IP Address. Each application overview document illustrates the following configuration and other information about the respective application: connections between the application and backend database servers or database instances (in the backend database servers), an indication of which servers currently execute the application and links to the server configuration documents for these servers. Each application overview diagram illustrates (as boxes) all the servers that run the application, connections (as lines) between the servers and connections (as lines) between the instances of the application and their backend database servers. In the illustrated embodiment, the application overview diagram illustrates the servers hierarchically as in FIG. 1, but each application overview diagram is limited to the servers that run the application, their load balancing servers, and the backend database servers accessed by the application. If desired, each application overview diagram can be created dynamically as needed by the support person, or program 110 can generate the application overview diagrams ahead of time. The application overview diagrams are displayed as web pages or in other electronic form.

Each server configuration document includes the following configuration information about the respective server: IP addresses for incoming messages in the case of web servers and application servers, IP addresses for hosted ports in the case of database servers, virtual host information (i.e. URL and IP Addresses) in the case of web servers and application servers, an indication of which applications this server is currently executing and links to the application overview diagrams for these applications. If desired, each server configuration document can be created dynamically as needed by the support person, or program 110 can generate the server configuration documents ahead of time. The server configuration documents are displayed as web pages or in other electronic form.

The application overview diagrams and server configuration documents are stored in a relational database to facilitate subsequent searches through them. Program 110 updates these application overview diagrams and server configuration documents, based on new configuration information, periodically or when significant changes occur.

Next, program 110 searches the data gathered and reported by the agent programs in step 264 for that which is needed to generate trouble shooting documents (step 290). Then, program 110 processes this data to generate the trouble shooting documents (step 296). The trouble shooting documents, which will appear on a screen as a web page or other electronic document, will include links to automatically test the servers which participate in responding to a client request and connectivity to or between these servers. Consider an example where the customer problem involves an application on server 62 or 64, and the customer request does not require input from any other application server. In this example, the links in the trouble shooting documentation/diagram will automatically test load balancer 50, web server 52 and web server 54, and connectivity between load balancer 50 and web server 52 and between load balancer 50 and web server 54. The links in the trouble shooting documentation/diagram will also automatically test load balancer 60, application server 62, application server 64, database server 72, database server 74 and database server 76, and connectivity between load balancer 60 and application server 62, between load balancer 60 and application server 64, between application server 62 and database servers 72, 74 and 76, and between application server 64 and database servers 72, 74 and 76. The links in the trouble shooting documentation/diagram will also automatically test connectivity between server 52 and load balancer 60 and between server 54 and load balancer 60, although this will be done via servers 52 and 54. After logging on to server 52, the link will send a command to server 52 to send a hardware, software, or network status inquiry to load balancer 60. The command can be as follows: "PING (IP address of server 60)" but may be any command or set of commands which perform a status inquiry. If needed, after logging on to server 54, the link will send a similar command to server 54 to send a hardware, software, or network status inquiry to load balancer 60. In this example, there is no need to test load balancer 80, application server 82, application server 84, database server 92 or database server 94 or connectivity between load balancer 80 and application servers 82 and 84 or between application servers 82 and 84 and database servers 92 and 94 because the load balancer 80, servers 82 and 84 and database servers 92 and 94 are not involved in executing the application in server 62 or 64. However, if the application on server 82 or server 84 was required to assist the application on server 62 or 64 to handle the customer request, then the trouble shooting documentation/diagram would also include links to test load balancer 80, application servers 82 and 84 and database servers 92 and 94, and connectivity between load balancer 80 and application server 82, connectivity between load balancer 80 and application server 84, connectivity between server 82 and database servers 92 and 94, and connectivity between server 84 and database servers 92 and 94. The links in the trouble shooting documentation/diagram will also automatically test connectivity between server 62 and load balancer 80 and between server 64 and load balancer 80, although this will be done via servers 62 and 64. After logging on to server 62, the link will send a command to server 62 to send a hardware, software, or network status inquiry to load balancer 80. If needed, after logging on to server 64, the link will send a similar command to server 64 to send a hardware, software, or network status inquiry to load balancer 80.

The term "hardware, software, or network status inquiries" represents a class of activities whereby a test or status request is made to the subject component (hardware, software or network), and the subject component replies with status information or the results of the test. Many of these inquiries operate in broadly divergent ways, and representative examples are provided below.

Three, basic network status inquiries are "ping", "traceroute" and "netstat", although these three inquiries typically test the server's hardware and operating system as well as the network path leading to them. Initiation of a "ping" sends a network packet to the specified server. The network packet asks the server to reply, then reports whether or not a reply was received. Initiation of a "traceroute" sends a network packet to the specified server. The network packet asks every network link in the path to that server to reply, then reports the reply status of every link in the path. "Netstat" is a command sent to a server which, depending on parameters specified in the Netstat command, solicits the number of open network connections on a server, the ports those connections are using, the number of packet errors received, the total amount of network traffic, and other such information. "Ping", "traceroute" and "netstat" are known commands.

The hardware, software or network status inquiry may also include a request to open a web page/application at the server, where the web page/application is intended to report status information about the server. For example, a known snoop servlet web page on an IBM Websphere server reports the servlet name and requested URL, from which the correct operation of the server's servlet engine can be determined. A page with the URL of the Websphere server and the snoop servlet "d03was100/snoop" and the name "Snoop Servlet" will be returned if the servlet engine is functioning correctly. A page with "500 error" will be returned if the servlet engine is not functioning correctly. For purposes of this patent application, the term "hardware, software or network status inquiry" does not include a URL request to open the application for which the customer reported a problem.

Alternatively, the link may initiate a more complicated, hardware, software or network status inquiry in place of or in addition to the simple network "ping", "traceroute" or "netstat" inquiry.

An example of a software status inquiry is a status check of a Cell Directory Server, which is done with the following command:

cdscp show clearinghouse/ . . . /$cell/${serverprinc}_ch

Another example of a software status inquiry is a status check of an OSF Distributed File System Server with the following command:

/usr/bin/bos status/ . . . /${cell}/hosts/${serverprinc}

An example of a hardware status inquiry is an AIX "errpt" command, which returns information about hardware failures detected on the server in addition to operating system and software failures. These failures can include bad blocks read from hard disk drives, and component failures such as failures of network interface cards, input/output busses, memory boards, and (where redundant components are used) CPUs and power supplies. Another hardware status inquiry is "lscfg" which lists all of the hardware components configured to a server, and whether or not configured devices are active.

The more complicated hardware, software or network status inquiry may automatically perform one or more of the following steps at the target server to ascertain the hardware, software or network status: logging in/authentication, setting environment parameters, setting software debug parameters, and initiating commands.

To attempt logon, selection of a logon hyperlink can initiate a shell "expect script". This script automatically sends the userid and password as it would be typed from a keyboard and can be used for logon as well as command execution. To attempt logon/authentication, selection of a logon/authentication hyperlink can also initiate a shell "rexec" script, wherein the command to be executed is sent along with the userid and password to the target server. The "expect script" and "rexec script" were known in the art. To attempt authentication (but not logon), selection of an authentication hyperlink can initiate a shell "rlogin" script or "kerberos tickets" script. These two scripts are coupled with some other means for executing commands such as expect, ssh, or rexec. The "rlogin" script and "kerberos tickets" script were known in the art.

"Set environment" refers to setting operating system variables that may be required for the status inquiry to execute properly. An example would be the "PATH" variable which may be required to point to binaries that contain the status inquiry code. In the foregoing examples of software status inquiries, "${cell}", and "${serverprinc}" are environment variables, and setting them means assigning a value to those variables, such as cell="ssd.sanjose.ibm.com"

"Software debug parameters" are similar to environment variables described above, except that software debug parameters are set for a specific application rather than the operating system. Internal software may have settings such as "verbose mode" (which increases the quantity of output for status inquiries) that program 110 needs to set in order to obtain the information it needs. Thus, selection of a hyperlink will set software debug parameters as needed to obtain the requisite status inquiry information.

As with login/authentication, two examples of command initiation are "expect scripts" and "rexec". The simplest means of initiating commands is to run them locally, i.e. in the server whose status is queried, which is done by inserting the command in a shell script, as described below.

In each of the foregoing cases, selection of a hyperlink launches a shell script which performs the associated status inquiry and setting of parameters as appropriate for that server. A "shell script" is known in the art and aggregates multiple commands into a file which can be executed with a single action. Alternatively, there could be separate hyperlinks for each type of status inquiry, or even each specific status inquiry, if that level of granular control is desired under circumstances.

Program 110 reads the results of the status inquiries, and searches the results for key words or symbols which indicate whether the component being queried is functioning within normal parameters or is malfunctioning. The process of searching the results for key words or symbols is called "parsing". The general process of "parsing" is known in the art. The specific key words/symbols which are parsed by program 110 are unique for each type of status inquiry. For example, ping returns several lines of information, but program 110 is only concerned with parsing the line that lists the number of packets sent and the number of packets received back. A ping to a server that is operational and reachable over the network will contain a line similar to the following:

Packets: Sent=4, Received=4, Lost=0 (0% loss)

In contrast, the output of a ping to a server that is totally turned off or unreachable over the network will contain a line that reads something similar to the following:

Packets: Sent=4, Received=0, Lost=4 (100% loss)

The foregoing links in the trouble shooting documentation/diagram includes links which automatically send a hardware, software, or network status inquiry to the respective servers. The support person can "click-on" or otherwise select the link (associated with the server to be queried) to initiate the hardware, software, or network status inquiry. In response, the tool 110 will automatically send a hardware, software, or network status inquiry to the respective server in server system 40. Consider an example, where the status inquiry is a "ping". As explained above, a "ping" is a well known process of sending a network packet request to a server, and listening for a response. The program 110 will receive the response, if any, from the respective server. A response to a ping indicates that the pinged server is responding at some level, although the ping response will not indicate that the application is running, and will not necessarily indicate that the server's operating system is running properly. The ping response is generated by lower level hardware, micro code and/or the operating system. The pinging does not require prior logon by the support person; the support person need only click-on or select the link, and program 110 will automatically send the ping and listen for the response. The trouble shooting documentation explains what is meant if a response to the ping is received, i.e. that a connection has been made to the server, and the server is responding at some level. The trouble shooting documentation also explains what is meant if a response to the ping is not received, i.e. that the respective server or connection between server 20 and the respective server is not functioning. The trouble shooting documentation also explains what to do next if the response to the ping is received and if the ping is not received. For example, if the ping response is received, the trouble shooting documentation may recommend the following: attempt to logon to the server's operating system and if successful, attempt to logon to the application on the server, attempt to logon to the application without first attempting to logon to the server's operating system. If the response to the ping is not received, the trouble shooting documentation explains that the server is either "turned off" or there may be a bad connection to the respective server in server system 40 is down, or there is a network problem, and may recommend that the support person contact a systems administrator or the second level support person for the respective server to attempt to start the respective server. Even though in this case, the first level support cannot positively identify the problem, at least the first level support person with the assistance of the application support documentation has localized the source of the problem to the specific server which did not respond to the ping.

The trouble shooting documentation explains the results of the hardware, software or network status inquiry and the appropriate next steps related to the hardware, software or network component that was queried. This may include dispatching a technical expert for the component that the query indicates is unresponsive or otherwise outside of normal operating parameters.

Some of the servers in server system 40 support logon to the server's operating system as well as separate logon to the applications that run on the server. Other of the servers in server system 40 do not support logon to the server's operating system but support logon to the applications that run on the server. In some cases, the trouble shooting documentation generated in step 296 also includes a follow-up link to invoke and display a logon screen for the respective server's operating system and/or application, if the hardware, software, or network status inquiry was successful. When the support person selects the logon link, the tool sends a script to the respective server to invoke and return the logon screen(s). In other cases, the trouble shooting documentation does not include a link to invoke and display a logon screen for the server's operating system or application, but instead includes detailed, step-by-step instructions on how the support person at server 20 can remotely attempt to logon to the respective server's operating system and/or application. If the support person can successfully logon to the server's operating system, this indicates that the server and its operating system are running properly. If the support person can successfully logon to the application (running on this server) as well, this indicates that the application is running as well. The trouble shooting documentation also explains what to do next if the logon attempt to the server's operating system was not successful, if the logon to the server's operating system was successful but the logon to the application was not successful, and if the logon attempt to the server's operating system or application are both successful.

If the logon attempt to the server's operating system is not successful, the trouble shooting documentation will recommend that the support person contact a systems administrator for the respective server or the second level support person to attempt to restart the respective server. Thus, the support person with the assistance of the application support documentation has identified the server which is probably at fault, and which person is best suited to resolve the problem, i.e. the systems administrator or second level support person for the identified server.

If the logon attempt to the server's operating system is successful, the trouble shooting documentation will recommend that the support person attempt to logon to the application.

If the logon attempt is successful for the server's operating system, but not successful for the application, the trouble shooting documentation will when feasible, recommend that the support person attempt to remotely restart the application, and provide detailed step-by-step instructions how to restart the application. In other cases where this is not feasible, the trouble shooting documentation will recommend that the first level support person contact an application support person for the application to attempt to restart the application and if that is unsuccessful, perform other troubleshooting. Thus, the support person with the assistance of the application support documentation has identified the application which is probably at fault, and which person is best suited to resolve the problem.

If the logon attempt to server's operating system and the application are both successful, the trouble shooting documentation will indicate that there is nothing wrong with the application itself. The trouble shooting documentation will then identify other, related servers and applications. These are the other servers that run this application, the backend servers for the servers that run this application, and any other servers and their applications that participate, together with the application for which the problem was reported, in providing the requested service to the customer. Then, the trouble shooting documentation will repeat the foregoing process to display the hardware, software, or network status inquiry links, logon links, if any, and logon instructions for these other, related servers and applications.

There are also links for the URLs of the applications to be tested. These links can include the IP address and hostname for the application, or the standard URL hostname/application form. The form which includes the IP address bypasses a domain name server. Consequently, if there are any problems with the domain name server, these problems will not impact the response from the application server.

The following are other examples of trouble shooting instructions and corrective actions generated and displayed by the trouble shooting documents:

P1.
   Attempt to access an application via URL. (does not work)
   Attempt to access an application via ip address. (works)
S1.
   Contact the DNS Administrators as this indicated; there could be a problem with DNS.
P2.
   Attempt to ping server (server does not respond)
   Ensure there are not firewall rules that prevent pinging. (none noted)
   Attempt to log on to server. (failed. No response)
S2.
   Contact System Administrator of that server. Server appears to be non-functional. Also check for any generalized network errors as this could be a network problem too.
P3.
   Attempt to access web page. (no response from web server)
   Attempt to access web page by ip address. (no response)
   Attempt to log on to web server. (responds and allows login. This indicated the server is functional.)
   Check to see if web server is running. Issue command "ps-ef|grep httpd". (no response.)
S3.
   Depending on site rules either execute the http start script or contact the web administrators.
P4.
   Web site is working but times out when users attempt to logon.
   Access Web server and WebSphere servers via URL. (works, meaning servers are operational and ping tests not required)
   Attempt to log on to database server using command "telnet ipaddress 50000". (responds, meaning database is running)
   Enter user name and password. (does not respond)
S4.
   Database username and password may have expired or are not valid. Contact Database Administrator and have them ensure username and password are valid.

These are serveral examples where the problem may not be able to be immediately repaired, but the source of the problem can be quickly identified and the appropriate group notified quickly.

There are also links to the support groups that provide second level support, as well as specific relevant instructions that are manually entered. This system is designed to automate the process of documenting systems, but not completely replacing manual instructions that may also be relevant. It will have the ability to store both the automated documentation, as well as critical notes or other issues.

There can be two sets of trouble shooting documents, one set for the first level support person and the other set for the second level support person. For example, for some sensitive applications and databases, passwords (required for logon to an application) may be omitted from the first level support person's trouble shooting documents but included in the second level support person's trouble shooting documents.

The trouble shooting document also specifies the IP addresses of web sites which are potentially subject to denial of service attacks, and instructions on how to attempt logon to them (without pinging them first). In certain web hosting environments pings and network ICMP traffic (which is what the ping uses) are turned off to prevent DOS and other attacks. In these cases, as an alternative to ping tests, the links will attempt to logon to the server directly rather than first pinging the server. In some cases the logon process is more difficult, but this can be determined by reviewing the IP addresses and network configuration of the servers.

The trouble shooting documentation can also include links to automatically query event logs within the servers within server system 40. The event logs contain information such as CPU failures, network failures, web page failures, etc.

Server system 40 can also include an event monitor server (not shown) such as a known IBM Tivoli events server which monitors availability of the servers in server system 40. The event monitor server is coupled via networks to each of the servers in system 40 and identifies outages of the servers and other errors in the servers, by known techniques. The trouble shooting documentation can include links to automatically query the event monitor server to obtain and display a list of current outages and other errors in the servers in server system 40.

Figure 3:
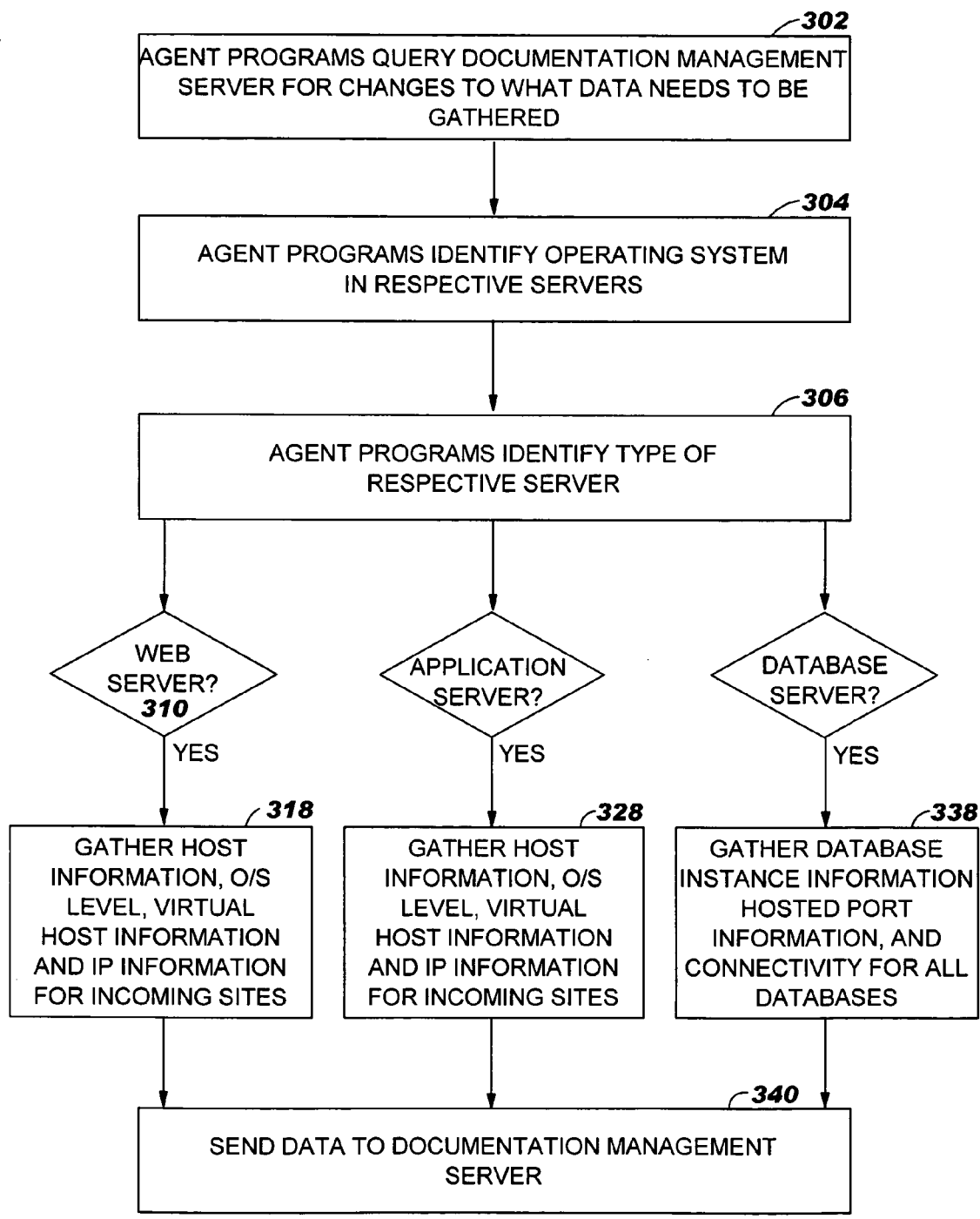
FIG. 3 is a flow chart of the programming within the servers of the distributed computer system of FIG. 1 to gather configuration and other information for the application support documentation.

FIG. 3 illustrates step 264 in more detail, where agent programs 550, 552, 554, 560, 562, 564, 572, 574, 576, 578, 580, 582, 584, 592 and 594 execute and gather configuration and other data within their respective servers, and report the data to program 110 in documentation management server 20. In the illustrated embodiment, each of the agent programs 550, 552, 554, 560, 562, 564, 572, 574, 576, 578, 580, 582, 584, 592 and 594 is a script program, i.e. a programmed series of commands that simulate and automate manual commands entered by an operator at the respective server. In step 302, agent programs 550, 552, 554, 560, 562, 564, 572, 574, 576, 578, 580, 582, 584, 592 and 594 query program 110 for any changes in the types of configuration or other information needed by program 110. If there are such changes, then program 110 downloads a respective update to agent programs 550, 552, 554, 560, 562, 564, 572, 574, 576, 578, 580, 582, 584, 592 and 594. The update can be an update to script program within the agent program or an update to parameters within the script program. Next, agent programs 550, 552, 554, 560, 562, 564, 572, 574, 576, 578, 580, 582, 584, 592 and 594 determine the type of operating system within their respective server (step 304). Agent programs 550, 552, 554, 560, 562, 564, 572, 574, 576, 578, 580, 582, 584, 592 and 594 determine the type of operating system in their respective server by querying a known data gathering program function associated with the operating system. This data gathering function queries a file within the respective server which identifies the operating system. For example, in the AIX operating system, this known data gathering function is called "oslevel –l" or "lslpp –l" for specific OS components.

Next, agent programs 550, 552, 554, 560, 562, 564, 572, 574, 576, 578, 580, 582, 584, 592 and 594 determine the type of their server, i.e. http, application, database, etc. (step 306). Agent programs 550, 552, 554, 560, 562, 564, 572, 574, 576, 578, 580, 582, 584, 592 and 594 determine the type of their server by searching for files (typically in standard locations) indicative of the type of server. For example, an IBM Websphere web server contains a WebSphere binary file, and the agent program will search for this binary file. If the agent program locates this WebSphere binary file, the agent program knows that the server is a web server. As another example, an application server may include Apache configuration files, and the agent program will search for the Apache configuration files. If the agent program locates the Apache configuration file, the agent program knows that the server is an application server. As another example, a database server (such as Oracle database, IBM DB2 database, etc.) typically contains a database binary file, and the agent program will search for this binary file. If the agent program locates this database binary file, the agent program knows that the server is a database server.

If the server being queried by the respective agent program is a web server (decision 310), then the agent program gathers the following server information: operating system level, virtual host information (i.e. name of all applications within the server, IP address for each application, directories for web pages associated with the application), IP addresses for URLs for applications within the server that are addressed by incoming requests (step 318). The agent program obtains the operating system level by querying the known data gathering function associated with the operating system. The agent program obtains the virtual host information by accessing HTTP.conf or other configuration files for the web server. The agent program obtains the IP addresses by querying a netstat, ifconfig, or ipconfig or other function which looks at the operating system's network configuration and extracts the necessary information.

If the server being queried by the respective agent program is an application server (decision 320), then the agent program gathers the following server information: operating system level, virtual host information, IP addresses for URLs for applications within server that are addressed by incoming requests (step 328). The agent program obtains the operating system level by querying the known data gathering function associated with the operating system. The agent program obtains the virtual host information by accessing HTTP.com or other configuration files for the web server. The agent program obtains the IP addresses by querying a netstat, ifconfig, or ipconfig or other function which obtains the network information from the operating system.

If the server being queried by the respective agent program is a database server (decision 330), then the agent program gathers the following server information: identities and listening port of database instances, IP addresses of hosted ports and (i.e. authorized user name/password or authorized partner IP addresses) for each database instance (step 338). The agent program obtains the identities and listening ports of the database instances by accessing files which contain this information. For example, the listening port information may be stored in an /etc/services file. The information for the identity information may be stored in the /etc/services file and/or an orahosts file for an Oracle database. The agent program obtains the hosted port IP addresses by querying the database itself. The agent program obtains the connectivity information by querying the database itself.

After the information is collected in steps 318, 328 and 338, the respective agent programs 550, 552, 554, 560, 562,

564, 572, 574, 576, 578, 580, 582, 584, 592 and 594 send the data to program 110 to generate the application support documents (i.e. application overview diagrams, server configuration documents and trouble shooting documents) described above (step 340).

Figure 4:
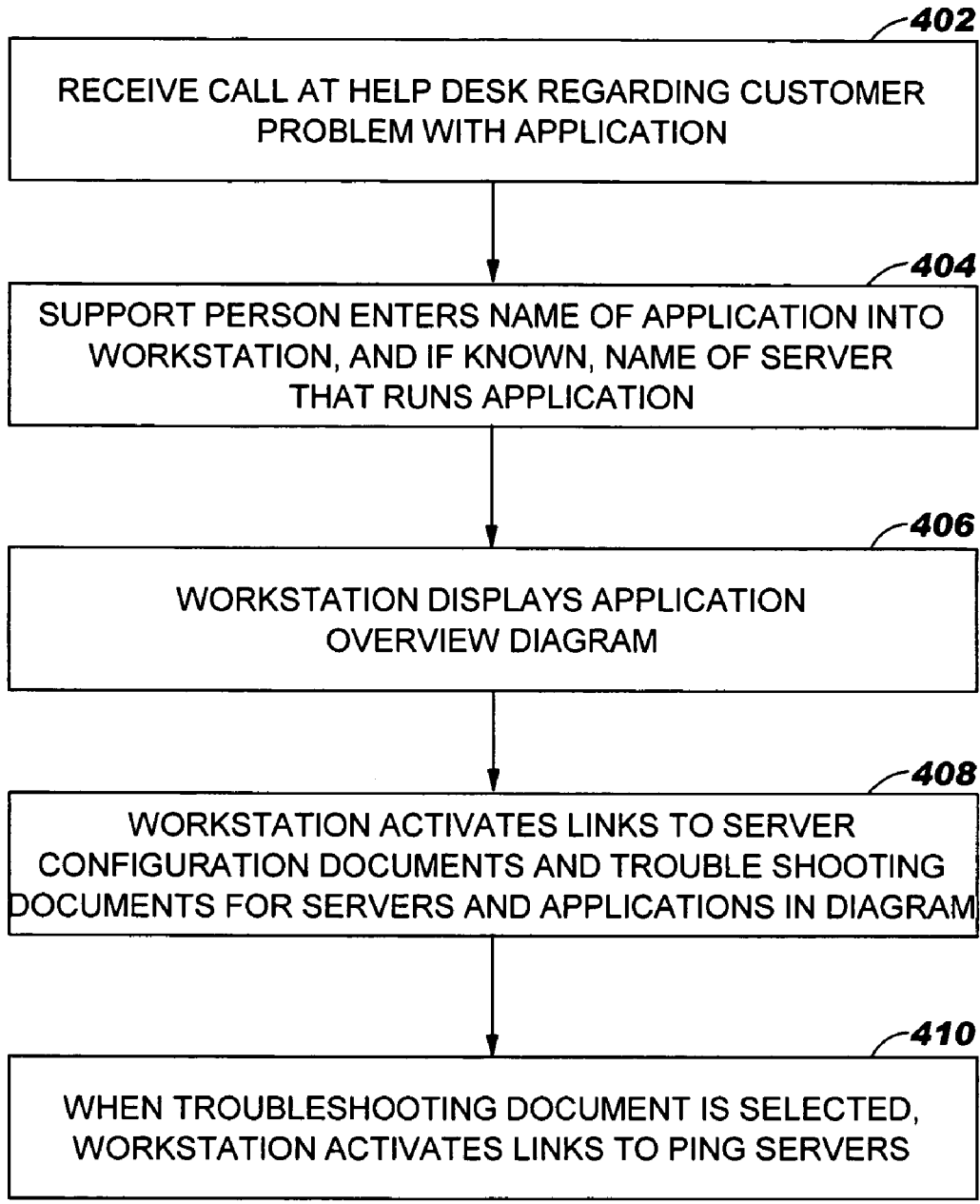
FIG. 4 is a flow chart illustrating usage of the application support documentation of FIG. 2.

FIG. 4 illustrates the content and use of each application overview diagram and server configuration document generated in step 280 and each troubleshooting document created in step 296, in more detail. In step 402, a customer calls the help desk to troubleshoot and correct a problem with an application identified by name or URL. In response, the first level support person enters into server 20 a name of the customer application or URL (for which the customer is reporting a problem) (step 404). Occasionally, the first level support person will know through experience the name of the server that is running the application and can also enter the server name in step 404. (The first level support person also creates a problem ticket any time a call comes in and a problem exists, even if the helpdesk person can resolve the issue right then. This allows tracking of both the call and the issue that it represents, as well as the amount of time that it takes to resolve the problem.) In response, program 110 generates and displays the application overview diagram generated in step 280 and a link to the corresponding server configuration documents and trouble shooting documents/diagrams described above (step 406). The application overview diagram gives the support person an overview of the environment of the application and its relationships to other servers and applications. In some case, the support person may know that a certain server is down, and, if this server appears in the application overview diagram, then the support person can readily identify the likely problem. (In such a case, typically someone else is already attempting to fix the problem.) The application overview document also includes links to the corresponding troubleshooting documents/diagrams and server configuration documents, and program 110 activates those links (step 408). As explained above, the trouble shooting documents/diagrams include links to test connectivity by pinging, or traceroute, occasionally links to facilitate logon, other hardware, software, or network status inquiries, and instructions on how to manually logon to the server's operating system and application. A "traceroute" is a service which not only pings the target server, but also records and reports back what route the pinging packet took to reach the target server and return from the target server. As used in this patent application, the term "ping" encompasses both pinging and tracerouting. Program 110 activates those connectivity testing links (step 410). The troubleshooting document also explains what to do, to further diagnose or correct a problem, if any of the servers or backend databases do not respond to the PING hardware, software, or network status inquiry or permit logon.

Figure 5:
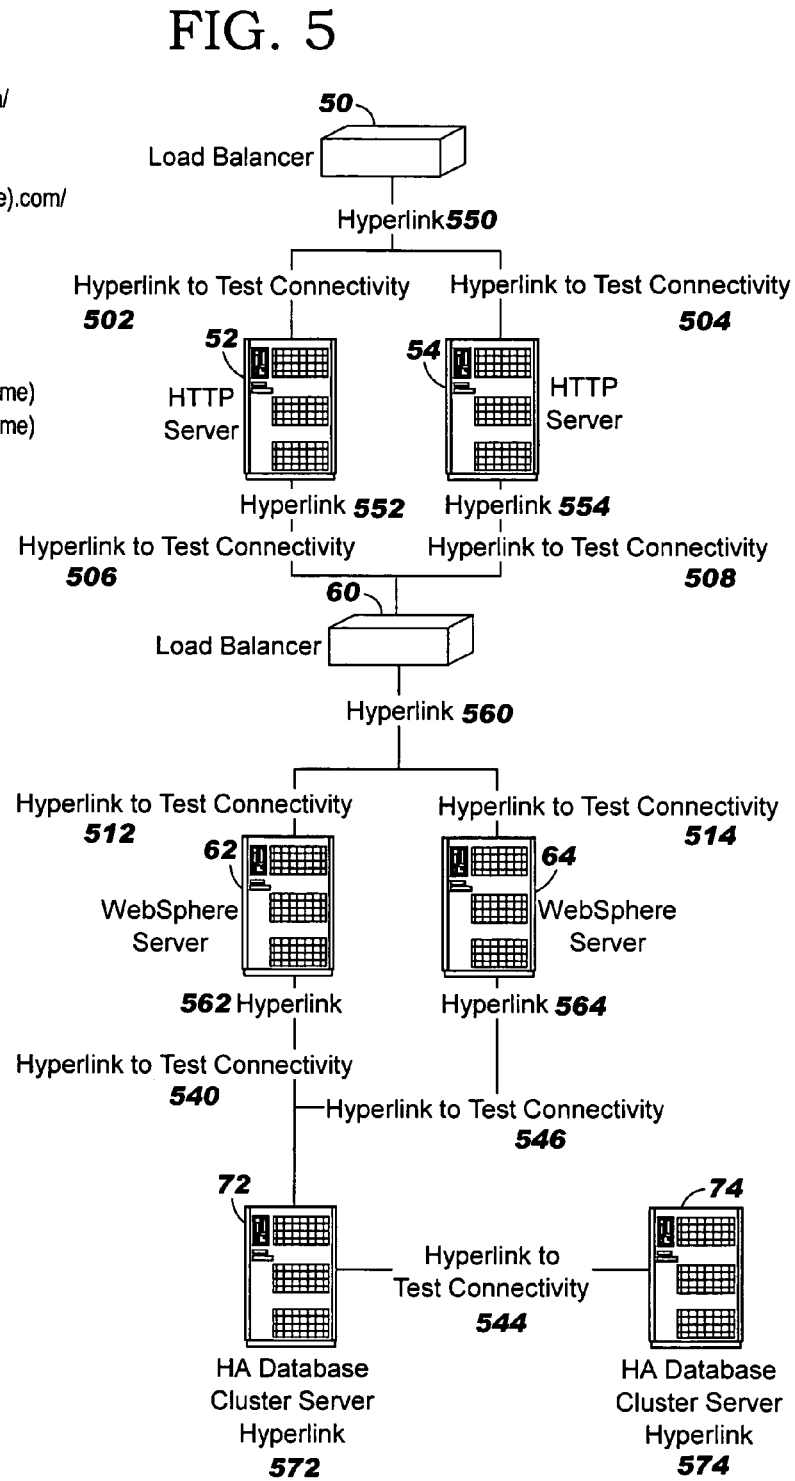
FIG. 5 is an example of a diagram generated by the documentation management server and related programming of FIG. 2, which diagram includes hyperlinks to automatically test connectivity and display instructions to manually test connectivity.

FIG. 5 illustrates an example of a trouble shooting document/diagram that will be displayed when an application on server 52 or 54 is identified by the customer as "down", and this application only involves servers 50, 52, 54, 60, 62, 64, 72 and 74 and the applications on those servers or the databases accessed by those servers. This diagram illustrates servers 50, 52, 54, 60, 62, 64, 72 and 74 and communication paths, shown as lines, between the servers. In the illustrated example, the paths/lines leading to the servers are hyperlinks, and the paths/lines between the servers are hyperlinks. The paths/hyperlinks 502, 504, 512, 514 and 544 leading to servers 52, 54, 62, 64 and 74, respectively, when selected by a mouse button or otherwise, automatically send a hardware, software, or network status inquiry to the respective servers 52, 54, 62, 64 and 74, respectively. If the hardware, software, or network status inquiry was successful, program 110 displays instructions of what to do next, such as to attempt logon to the server/operating system and then the application. If the hardware, software, or network status inquiry was not successful, program 110 also displays instructions of what to do next to troubleshoot the problem and correct the problem, as described above.

The path/hyperlink 506, between servers 52 and 60, when selected by a mouse button or otherwise, automatically pings four servers 52, 60, 62 and 64. The path/hyperlink 508, between servers 54 and 60, when selected by a mouse button or otherwise, automatically pings four servers 54, 60, 62 and 64. The path/hyperlink 540, between servers 62 and 72, when selected by a mouse button or otherwise, automatically pings two servers 62 and 72. The path/hyperlink 546, between servers 64 and 74, when selected by a mouse button or otherwise, automatically sends a hardware, software, or network status inquiry to two servers 64 and 72. If the hardware, software, or network status inquiries were successful, program 110 displays that the hardware, software, or network status inquiry to each of the pinged servers was successful and displays instructions of what to do next, such as to attempt logon to these servers/operating systems and then their applications. If any of the hardware, software, or network status inquiries were not successful, program 110 displays that a message that the hardware, software, or network status inquiry was not successful to a named server, and also displays instructions of what to do next to troubleshoot the problem and correct the problem with the named server, as described above. The number and relationship of the servers that are collectively pinged by selection of a single connection hyperlink depend on the architecture of the computer system. One possible strategy is use a single connection hyperlink to collectively send hardware, software, or network status inquiries to the smallest group of servers that are likely to include the problematic server (and use other connection hyperlinks to send a hardware, software, or network status inquiry to respective, individual servers).

In the diagram of FIG. 5, each one of the server icons itself is also a hyperlink to application level documentation such as that illustrated in FIG. 6. In the illustrated example, the icons for servers 50, 52, 54, 62, 64, 72 and 74 are also hyperlinks 550, 552, 554, 562, 572 and 574, respectively for those servers. When the support person selects (by clicking with a mouse button or the like) one of the server icons, program 110 displays a diagram such as that illustrated in FIG. 6 corresponding to the server whose icon was selected. The diagram of FIG. 6 lists each application running on the selected server, and instructions to test connectivity to that server. The first testing instruction is to select the automated hyperlink(s) described above with reference to FIG. 5 to automatically send a hardware, software, or network status inquiry to the server(s). The next instructions advise the support person of what commands to manually enter to send a hardware, software, or network status inquiry to the server. The hardware, software, or network status can be requested by specifying the host name and application; however, this will require that a domain name server translate the host name and application to an IP address. So, if the domain name server is down, this will prevent the hardware, software, or network status inquiry from reaching the intended server. The hardware, software, or network status inquiry can also be requested by specifying the IP address of the application. This hardware, software, or network status inquiry with the IP address of the application will circumvent the domain name server, and reach the intended server despite a failure of the domain name server. The next instructions advise the support person of what commands to manually enter to logon to the server/operating system.

The logon instructions will be as follows:

1. Open the start menu on helpdesk workstation.
2. RUN-type "cmd"
3. In the command window type the following "telnet server-ip-address" (automatically determines the correct IP.
4. Input username and password.

The next instructions advise the support person of what commands to manually enter to attempt to access/open the application by using a web browser to send the URL for that application.

Based on the foregoing, a system, method and program for generating and displaying application support documentation and related troubleshooting documentation have been disclosed. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A system for creating a reference document for an application, said system comprising:
    means for identifying an application server which is supposed to be executing said application and querying said application server to identify a database server from which said application obtains data to respond to a client request; and
    means for automatically generating and displaying or printing a diagram of said application server, said database server or a database managed by said database server, and a connection between said application server and said database server or managed database; and
    wherein the identifying means identifies said application server based on user input of an identification of said application.

2. A system for creating a reference document for an application, said system comprising:
    means for identifying an application server which is supposed to be executing said application and querying said application server to identify a database server from which said application obtains data to respond to a client request; and
    means for automatically generating and displaying or printing a diagram of said application server, said database server or a database managed by said database server, and a connection between said application server and said database server or managed database; and
    wherein said diagram also includes a description of a procedure for logging onto said application server.

3. A system for creating a reference document for an application, said system comprising:
    means for identifying an application server which is supposed to be executing said application and querying said application server to identify a database server from which said application obtains data to respond to a client request; and
    means for automatically generating and displaying or printing a diagram of said application server, said database server or a database managed by said database server, and a connection between said application server and said database server or managed database; and wherein
    said diagram also illustrates (a) another application server that participates with the first said application server in responding to a customer request, and a connection between said other application server and said first application server, and (b) another database or another server that manages said other database for said other application; and
    the identifying and querying means queries said first application server to identify said other application server.

4. A computer program product for creating a reference document for an application, said computer program product comprising:
    a computer readable medium;
    first program instructions to identify an application server which is supposed to be executing said application and guery said application server to a database server from which said application obtains data to respond to a client request; and
    second program instructions to automatically generate and display or print a diagram of said application server, said database server or a database managed by said database server, and a connection between said application server and said database server or managed database; and wherein
    said first and second program instructions are recorded on said medium; and
    the second program instructions identify said application server based on user input of an identification of said application.

5. A computer program product for creating a reference document for an application, said computer program product comprising:
    a computer readable medium;
    first program instructions to identify an application server which is supposed to be executing said application and query sad application server to a database server from which said application obtains data to respond to a client request; and
    second program instructions to automatically generate and display or print a diagram of said application server, said database server or a database managed by said database server, and a connection between said application server and said database server or managed database; and wherein
    said first and second program instructions are recorded on said medium; and
    said diagram also includes a description of a procedure for logging onto said application server.

6. A computer program product for creating a reference document for an application, said computer program product comprising:
    a computer readable medium;
    first program instructions to identify an application server which is supposed to be executing said application and query said application server to a database server from which said application obtains data to respond to a client request; and second program instructions to automatically generate and display or print a diagram of said application server, said database server or a database managed by said database server, and a connection between said application server and said database server or managed database; and wherein said first and second program instructions are recorded on said medium; and said diagram also illustrates (a) another application server that participates with the first said application server in responding to a customer request, and a connection between said other application server and said first application server, and (b) another database or another server that manages said other database for said other application; and said first program instructions identify and query said first application server to identify said other application server.

* * * * *